Oct. 13, 1959 K. GROSSKOPF 2,908,555
GAS DETECTING DEVICE
Filed July 16, 1956

INVENTOR
KARL GROSSKOPF,
BY Bailey, Stephens and Huettig
ATTORNEYS

United States Patent Office 2,908,555
Patented Oct. 13, 1959

2,908,555

GAS DETECTING DEVICE

Karl Grosskopf, Lubeck, Germany, assignor to Otto Heinrich Drager, Lubeck, Germany Application July 16, 1956, Serial No. 598,131

Claims priority, application Germany July 15, 1955

10 Claims. (Cl. 23—254)

This invention relates to a gas detecting device. In particular, the invention is directed to a testing tube gas detector.

Gas testing devices are known which are composed of glass tubes containing an ampoule mounted above a reaction layer. This arrangement is necessary when it is dangerous to hold the reagent on a carrier. The disadvantage in using ampoules lies in that special means must be provided for opening them. Such means are the so-called shattering thorns. Another disadvantage lies in that such thorns cannot be reused because of the danger of polluting the reagent, and therefore a new thorn is required for each test.

An object of this invention is to provide a simple and practical manner of incorporating an ampoule in a testing tube.

In general, the object is obtained by using an ampoule having an elongated neck. The testing tube has a break-away portion with the neck of the ampoule positioned therein. The reagent layers are mounted in another portion of the testing tube. When the testing tube is broken at the break-away portion, the neck of the ampoule is also broken so that the contents of the ampoule can flow into the reaction layer. A flexible jacket is mounted at the break-away portion of the tube in order to keep the testing tube from shattering when it is broken and to substantially prevent the entrance of atmospheric air into the tube. The operator is also protected from glass fragments, and it prevents the spilling of the contents of the ampoule. Such jacket may be a piece of hose composed of synthetic material such as polyethylene or any other material which preferably can be shrunk onto the testing tube.

The break-away portion of the tube can be formed by indentations or depressions in the wall of the tube which may be symmetrically or asymmetrically arranged. Alternatively, a bead may be used to mark the breaking area portion.

Spacing means are provided for separating the ampoule from the tube, particularly at the break-away portion, such means being a laterally dented ring, a ring loop, or a wire spiral.

The means by which the objects of the invention are obtained are described more fully with reference to the accompanying drawings, in which.

Figure 2:
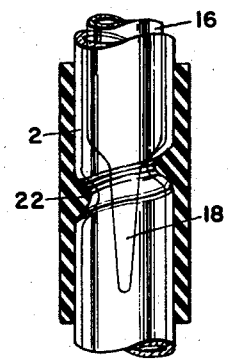
Figure 2 is a partial view similar to Figure 1 and showing a bead marking the breaking portion.

The glass testing tube 2 is provided with indented break-away portions 4 and 6, respectively. Reagent layers 8 and 10 are placed in the tube between portion 4 and the end of the tube, with the end 12 being drawn out to a point and sealed. At break-away portion 6, a flexible hose-like member 14 is shrunk on the tube. Mounted within the tube is an ampoule 16 having an extended neck 18 which is positioned in the break-away portion 6. The end of the tube is then drawn out into a point 19 and sealed. The ampoule is prevented from being seated on and closing break-away portion 6 by spacing means 20. As ampoule 16 has a diameter less than the inner diameter of tube 2, a passage is therefore left between the ampoule and the tube.

Figure 3:
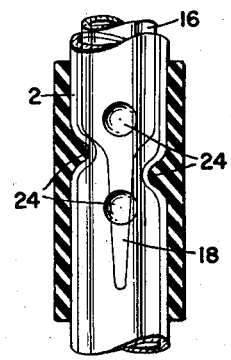
Figure 3 is a partial side elevation of the testing tube showing indentations for the break-away portion.
Figure 1:
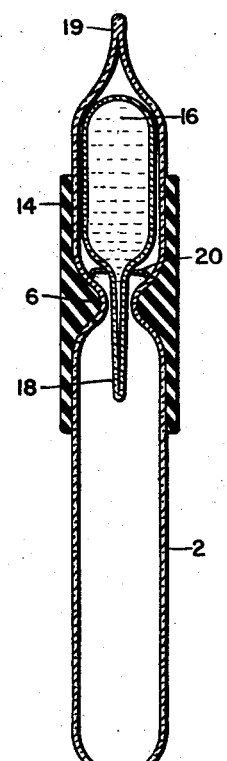
Figure 1 is a cross-sectional view through the testing tube having a depressed break-away portion.
Figure 4:
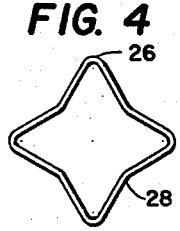
Figure 4 is a plan view of a wire ring for spacing the ampoule from the testing tube.
Figure 7:
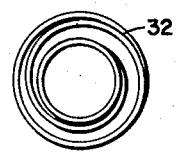
Figure 7 is a plan view of a wire spiral for spacing the ampoule from the testing tube.
Figure 5:
Figure 5 is a side elevational view of Figure 4.
Figure 8:
Figure 8 is a side elevational view of Figure 7.
Figure 6:
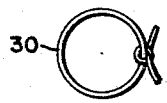
Figure 6 is a plan view of a wire loop for spacing the ampoule from the testing tube.

The break-away portion can be formed as an inwardly directed inclined bead 22 as in Figure 1, or as spaced indentations 24, symmetrically or asymmetrically arranged, as in Figure 3. Such beads or indentations at the same time serve as the spacing means 20. Also, the spacing means 20 of Figure 1 can have the shape of a wire ring 26 having indentations 28 thereon, as in Figures 4 and 5, or a wire loop 30 as in Figure 6, or a wire spiral 32 as in Figures 7 and 8.

In operation, the testing tube is first broken at break-away portion 6, neck 18 also being broken so as to permit the contents of ampoule 16 to be deposited on the reagent layers. Jacket 14 prevents outside air from entering the tube. The points 12 and 19 are broken and the gas to be tested drawn through the tube by any conventional means. The change in color in the layers 8 and 10 determines the content of the gas tested.

An example is given in the determination of formaldehyde. The reagents for determining formaldehyde are not storable on open carriers. Specifically, the reagent used is a sulphuric acid solution of $\beta$-naphthol sulphonic acid. Consequently, the sulphonic acid in dry form is incorporated in the reagent layers 8 and 10. The sulphuric acid in liquid form is contained in the ampoule 16.

The ampoule has a volume of about 0.2 cm.$^3$. It is vacuum filled with 70 volume percent sulphuric acid. The reaction layer, as layer 8, is composed of highly purified silica gel having a grain size of from 0.5 to 0.7 mm. and a poured weight of about 500 g./l. Every 100 g. of gel is homogeneously mixed with 0.4 g. of dry pure $\beta$-naphthol sulphonic acid.

Glass powder sintered with inorganic color pigments is sintered to a lemon-yellow color and used for the color comparing reagent layer 10.

In the quantitative detection of the amount of formaldehyde in air, the ampoule neck 18 is first broken as above described so that a sulphuric acid in ampoule 16 flows into layer 8 and dissolves the naphthol reagent. The points 12 and 19 are broken and air drawn through the tube until layer 8 turns to the same color as the comparing layer 10. From the number of suction strokes taken to draw the gas through the tube, the concentration of formaldehyde in the gas or air can be determined by comparison with a calibrating color chart.

Having now described the means by which the objects of the invention are obtained, I claim:

1. A gas testing device comprising a glass testing tube, breakable sealed points on the opposite ends of said tube, break-away means formed on and around the wall of said tube for breaking said tube, a flexible jacket surrounding said break-away means, and an ampoule mounted within said tube and having a breakable neck extending into the breaking area of said break-away means.

2. A gas testing device as in claim 1, said jacket being composed of synthetic material.

3. A gas testing device as in claim 2, said jacket further being shrunk on said tube.

4. A gas testing device as in claim 1, said break-away means comprising a depressed portion in said tube.

5. A gas testing device as in claim 1, said break-away means comprising a bead on said tube.

6. A gas testing device as in claim 1, said break-away means comprising a plurality of indentations in different levels in the wall of said tube.

7. A gas testing device as in claim 1, further comprising spacing means between said ampoule and the break-away portion of said tube.

8. A gas testing device as in claim 7, said spacing means comprising a wire ring having indentations thereon.

9. A gas testing device as in claim 7, said spacing means comprising a wire loop.

10. A gas testing device as in claim 7, said spacing means comprising a wire spiral.

References Cited in the file of this patent

UNITED STATES PATENTS

| | | |
|---|---|---|
| 1,928,998 | Kovacs | Oct. 3, 1933 |
| 2,559,231 | Seemar | July 3, 1951 |

FOREIGN PATENTS

| | | |
|---|---|---|
| 713,658 | Germany | Nov. 12, 1941 |